United States Patent [19]

Park et al.

[11] Patent Number: 5,475,037
[45] Date of Patent: Dec. 12, 1995

[54] AMORPHOUS POLYESTER FOAM

[75] Inventors: Chung P. Park, Pickerington; Gerald A. Garcia; Roby G. Watson, both of Newark, all of Ohio

[73] Assignee: The Dow Chemical Company, Midland, Mich.

[21] Appl. No.: 205,128

[22] Filed: Mar. 1, 1994

Related U.S. Application Data

[63] Continuation-in-part of Ser. No. 12,222, Feb. 2, 1993.

[51] Int. Cl.[6] .................................................. C08J 9/00
[52] U.S. Cl. ......................... 521/79; 521/80; 521/81; 521/82; 521/134; 521/138; 521/182; 521/910; 521/917
[58] Field of Search .......................... 525/437, 444; 521/79, 80, 81, 82, 134, 138, 182, 910, 917

[56] References Cited

U.S. PATENT DOCUMENTS

| | | |
|---|---|---|
| 4,259,478 | 3/1981 | Jackson, Jr. et al. |
| 4,280,005 | 7/1981 | Fox ........................................ 521/182 |
| 4,284,596 | 8/1981 | Inokuchi et al. |
| 4,323,528 | 4/1982 | Collins. |
| 4,351,911 | 9/1982 | Fox ........................................ 521/182 |
| 4,380,594 | 4/1983 | Siggel et al. ............................ 521/182 |
| 4,466,933 | 8/1984 | Huggard. |
| 4,956,395 | 9/1990 | Leduc. |
| 4,981,631 | 1/1991 | Cheung et al. |
| 5,110,844 | 5/1992 | Hayashi et al. ........................ 521/182 |
| 5,171,308 | 12/1992 | Gallagher et al. ..................... 521/182 |

FOREIGN PATENT DOCUMENTS

| | | |
|---|---|---|
| 59-210955 | 11/1984 | Japan. |
| 61-21353 | 1/1986 | Japan. |
| 64-22939 | 1/1989 | Japan. |
| 2247687A | 3/1992 | United Kingdom. |
| WO9010667 | 9/1990 | WIPO. |

OTHER PUBLICATIONS

Physical Property Data Sheet No. DS–165D, KODAR® PETG Copolyester 6763, Eastman Plastics, Jul., 1987.
Physical Property Data Sheet, KODAR® Copolyester A150, Eastman Chemical Products, Inc.
Physical Property Data Sheet No. DS–202C, Kodapek® PET Polyester 9663 (Clear), Eastman Polyester Plastics for Packaging.
"Special Buyers' Guide Issue & Encyclopedia '94", *Modern Plastics*, pp. 204–205, Mid–Nov. 1993.
Hughes, Carolyn S., *Terephthalate Polyester Resins and Films*, Chemical Economics Handbook, pp. 580.1171 A, M, N, H, G, T, J, K, L, 580.1173 S, T. U, V, and 580,1174 S, T, U, V, W, Sep. 1988, SRI Int.
Kirk–Othmer, *Encyclopedia of Chemical Technology*, Third Edition, vol. 18, pp. 531–537 and pp. 550–561.
ASTM Designation: D 1243–79, *Standard Test Method for Dilute Solution Viscosity of Vinyl Chloride Polymers*.

*Primary Examiner*—Samuel A. Acquah

[57] ABSTRACT

A low density foam having a density less than 15 pounds per cubic foot (240 kg/m³) is formed from an amorphous polyethylene terephthalate polymer. An expandable resin composition is also disclosed, comprising an amorphous polyethylene terephthalate polymer and a blowing agent mixture comprising a low permeability blowing agent and a high solubility blowing agent. Unexpanded and partially expanded foam particles, impregnated with the blowing agent mixture are disclosed. Numerous methods are disclosed for producing lightweight foams from amorphous polyethylene terephthalate polymers. One such method utilizes an Accumulating Extrusion Expansion System which avoids problems experienced with the prior art when attempting to extrusion expand polyesters.

21 Claims, 1 Drawing Sheet

AMORPHOUS POLYESTER FOAM

CROSS-REFERENCE TO RELATED APPLICATION

This is a continuation-in-part of application Ser. No. 08/012,222, filed Feb. 2, 1993.

BACKGROUND OF THE INVENTION

Foamed polymers have widespread application in areas such as insulation, flooring, carpet backing, wallpaper, packaging, general consumer goods, toys, and furniture. Although nearly all thermoplastic polymers may be foamed, only a few have gained significant commercial importance. One popular resin for foaming is polystyrene. Polystyrene is used in forming insulation, cushioning, packaging, and a variety of molded products. The popularity of polystyrene stems from its low density, good insulating qualities and its tendency to retain blowing agent which may be added to polystyrene resin for subsequent expansion of impregnated resin into foam. Such post expansion processes typically involve shipping unexpanded pellets of resin impregnated with blowing agent to various purchasers and manufacturers who then expand the pellets into appropriate forms by heating. The disadvantages associated with foamed polystyrene are that it is brittle and often breaks or fractures when subjected to moderate or even light forces.

Polyethylene would be desirable in many of the above applications in view of its relative strength, however polyethylene does not adequately retain blowing agent. The loss of blowing agent from impregnated resin thus presents environmental hazards and health concerns. Moreover, rapid loss of blowing agent from unexpanded polyethylene resin precludes post expansion processes. A polyethylene foam also has a relatively high thermal conductivity. It does not retain blowing agent which provides low thermal conductivity. It is, therefore, a poor thermal insulator.

Polyethylene terephthalate (PET) is recognized as a tough, versatile thermoplastic polyester often used for beverage bottles, food trays and custom containers. PET foams have a relatively low thermal conductivity and high barrier or retention qualities. However, PET is very difficult to foam after extruding.

When foaming polyesters such as PET, it is found that a relatively large amount of blowing agent must be used to stabilize or cool the solidifying foam structure. It is desirable to rapidly cool and solidify the foam thereby stabilizing the expanded bubbles. The use of large amounts of blowing agent assists in the cooling of the foam. As the blowing agent dispersed throughout the impregnated resin vaporizes, heat is absorbed from the foam surroundings to supply the heat of vaporization for the blowing agent. Cooling of the foam also occurs via adiabatic expansion of the blowing agent within the expanding foam structure.

Most conventional volatile organic blowing agents have relatively low solubilities in polyester resins, making it difficult to add the large amounts often required as described above. Blowing agents having high boiling points may be dissolved in polyester resins in sufficient amounts but readily diffuse out of the foam structure causing foam shrinkage. There is a need for a blowing agent which may be added to a polyester resin in relatively large amounts which will remain in the foam structure to a degree such that substantial foam shrinkage will not occur.

When extruding and expanding polyesters such as PET, it is difficult to obtain a low density foam of large cross section since PET foams tend to prefoam before passing through a die orifice, thus requiring small orifice sizes to be used. There is a need for an extrusion expansion process which yields lightweight foams having relatively large cross sections.

Thus, there is a continuing need for a low density polymeric foam having high barrier or retention qualities, which is less brittle and frangible than polystyrene foam, which is particularly extrudable, readily processable and amenable to a variety of foaming processes.

DETAILED DESCRIPTION OF THE DRAWINGS

SUMMARY OF THE INVENTION

Figure 1:
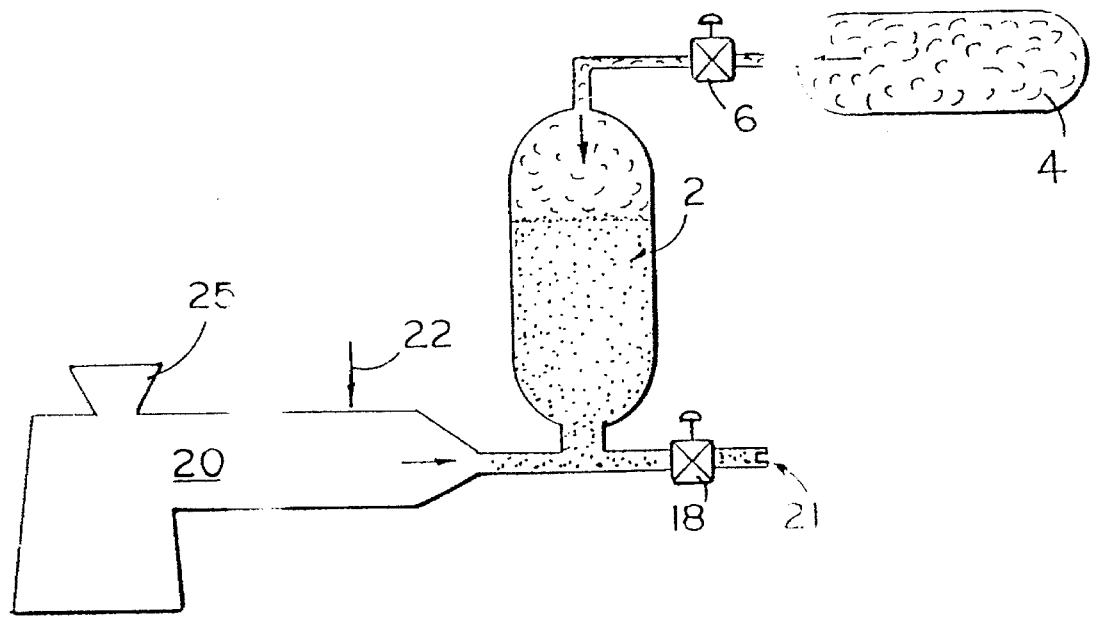
FIG. 1 illustrates a process schematic diagram for a pneumatic Accumulating Extrusion Expansion System used in the present invention.

In the present invention, it has been surprisingly discovered that an amorphous polyethylene terephthalate polymer can be foamed to surprisingly low densities, e.g. 15 pcf (240 kg/m$^3$) or less. Other aspects of the invention relate to methods of extruding and expanding such foam polymer compositions to such surprisingly low densities.

DESCRIPTION OF THE PREFERRED EMBODIMENT

The preferred embodiment provides methods for producing low density foams, expandable resin compositions and particles from amorphous polyethylene terephthalate polymers or resins.

Whereas polyethylene terephthalate (PET) is typically a crystalline polymer, the present invention employs an amorphous polyethylene terephthalate. The term "amorphous" as used herein for characterizing the types of polymers and resins which are suitable for use in the preferred embodiment, refers to substantially or essentially non-crystallizable polymers. An amorphous polyethylene terephthalate polymer as referred to herein either does not crystallize or has a crystallization half-time longer than about one hour. The crystallization half-time is generally determined at 160° C. under strain by X-ray diffraction methods. In contrast, the crystallization half-time of a non-amorphous polyethylene terephthalate polymer such as poly(ethylene terephthalic acid), a condensation product of ethylene glycol and terephthalic acid, is typically less than 10 seconds. Various techniques are known to those skilled in the art for producing amorphous polyethylene terephthalate polymers. One such technique involves utilizing a mixed diol, especially a mixed diol wherein one of the diols is a cyclic alkyl diol.

Generally, amorphous polyester resins may be produced by introducing irregularity in the polymeric chains. Such irregularity may be introduced in the molecular chains by utilizing and effecting polymerization in the presence of a plurality of diacids, diols, or both. Examples of suitable reactants for achieving the above described irregularity include, but are not limited to isophthalic acid, cyclohexanedimethanol, or mixtures of both. Generally, amorphous polyesters are produced by the incorporation of relatively large amounts of isophthalic acid or cyclohexanedimethanol or both in the polymeric structure.

Although the preferred embodiment polymers encompass an assortment of amorphous polyethylene terephthalate polymers, it is particularly desirable to utilize a copolyester of polyethylene terephthalate and a polycondensation product of a cyclic alkyl diol and terephthalic acid. A preferred amorphous copolyester resin of polyethylene terephthalate incorporates a polycondensation product of either (A) terephthalic acid with a mixed diol comprising from about 20 percent (weight percent of the diol component) to about 80 percent ethylene glycol and from about 80 percent to about 20 percent cyclohexanedimethanol, or (B) a mixed acid comprising from about 50 percent to about 85 percent terephthalic acid and from about 15 percent to about 50 percent isophthalic acid, cyclohexanedimethanol or mixtures of both. The diacid or diol reactants in both (A) and (B) embodiments could contain up to about 5 percent of other diacids or diols. Examples of such diols include, but are not limited to 1,2-ethanediol, 1,4-butanediol, and 1,4-cyclohexanedimethanol. Examples of such diacids include, but are not limited to isophthalic acid, orthophthalic acid, 1,4-naphthalenedicarboxylic acid, 1,5-naphthalenedicarboxylic acid, 2,6-naphthalenedicarboxylic acid, 4,4'-[1,2-diphenylethane]dicarboxylic acid, 4,4'-oxydiphenyldicarboxylic acid, 4,4'-diphenylmethyldicarboxylic acid, 4,4'-diphenylaminodicarboxylic acid, and 4,4'-diphenyldicarboxylic acid.

An especially preferred amorphous polyethylene terephthalate is based on terephthalic acid or equivalent reacted with at least stoichiometric amounts of ethylene glycol and 1,4-cyclohexane dimethanol. The mole percent of 1,4-cyclohexane dimethanol comprising the diol components of the polymer is from about 21 percent to about 41 percent, with the preferred amount being from about 28 percent to about 34 percent, and the most preferred amount being about 31 percent. Therefore, the molar ratio of ethylene glycol to 1,4-cyclohexane dimethanol in the polymer is from about 59:41 to about 79:21, with respect to one another. The polymer may be modified with a small amount of other polycarboxylic acids, diols, or both, as long as the polymer remains essentially amorphous after fabrication.

The polymer has an intrinsic viscosity of from about 0.6 deciliters per gram (dl/g) to about 1.4 dl/g. The preferred range of the intrinsic viscosity is from about 0.7 dl/g to about 1.2 dl/g. The intrinsic viscosity values recited herein are based upon a solution of the polymer described herein in a mixed solvent comprising 60% phenol and 40% tetrachloroethane at 25° to 30° C. The intrinsic viscosity as referred to herein is determined in accordance with ASTM D-1243-79 which describes dissolving various amounts of vinyl chloride polymeric resin in cyclohexanone to obtain numerous solutions of different, known concentrations. The flow times of the solutions are then measured, from which measurements of inherent viscosity and reduced viscosity may then be determined. The intrinsic viscosity is determined by mathematically extrapolating or graphically plotting the inherent viscosity and reduced viscosity against respective concentrations of polymer dissolved in solvent. The two lines (inherent viscosity and reduced viscosity) converge at a point of zero concentration of the polymer which represents the intrinsic viscosity.

There are several commercially available amorphous polyethylene terephthalate polymeric resins which are suitable for use in the preferred embodiment. KODAR PCTA Copolyester A150, available from Eastman Chemical, Inc. of Kingsport, Tenn., may be utilized. According to the manufacturer, KODAR PCTA essentially does not crystallize. In addition, KODAR PCTG Copolyester 5445, also available from Eastman Chemical, may be utilized. KODAR PCTG essentially does not crystallize.

An especially preferred polymer for use in the present invention is KODAR PETG 6763 resin, available from Eastman Chemical, Inc. of Kingsport, Tenn. The half time for crystallization of this material under ideal melt conditions is 60 hours. The 6763 resin is a polymer of terephthalic acid formed from ethylene glycol and 1,4-cyclohexane dimethanol, the two diols existing in a ratio of about 69:31 to one another. The intrinsic viscosity of the KODAR 6763 polyester resin is 0.75 dl/g. This measurement was determined by utilizing a solvent comprising 60% phenol and 40% tetrachloroethane, at 25° C. The manufacturer refers to this polymer as a "random block" polymer, referring to the fact that some coherent blocks may form as the three reactive moieties react, but the blocks are themselves random in size and location in the polymer chain.

There is a general relationship between the number average molecular weight and the intrinsic viscosity. The relationship, known as the Mark-Houwink relationship is $$\text{Intrinsic Viscosity} = 3.72 \times 10^{-4} \, (M_n)^{0.73}$$

where the intrinsic viscosity is expressed in dl/g and $M_n$ is the number average molecular weight of the sample. Thus the $M_n$ range for the polymer is from about 24,000 to about 80,000, and most preferably from about 30,000 to about 64,000.

A conventional volatile organic blowing agent, selected from hydrocarbons and halocarbons, may be used to prepare cellular materials from the polymers. Additionally, a small amount of inorganic blowing agents such as nitrogen and carbon dioxide or decomposable chemical blowing agents may be used together with the volatile organic blowing agents. Some of the useful blowing agents include ethane, propane, n-butane, isobutane, n-pentane, isopentane, neopentane, 1,1-difluoroethane (HFC-152a), 1,1-difluoro-1-chloroethane (HCFC-142b), 1,1,1-trifluoethane (HFC-143a), 1,1,1,2-tetrafluoroethane (HFC-134a), ethyl chloride, methylene chloride and 1,1,1-trichloroethane.

The preferred blowing agent is a combination of a low permeability blowing agent and a high solubility blowing agent. The present inventors have found that the use of such a mixed blowing agent mixture overcomes the problems of low solubility and loss of blowing agent from polyester foams. Examples of low permeability blowing agents include 1,1-difluoroethane, 1,1-difluoro-1-chloroethane, and isobutane. Examples of high solubility blowing agents are ethyl chloride and methylene chloride. An exemplary blowing agent mixture utilizes 1,1-difluoro-1-chloroethane, known as HCFC-142b as the low permeability blowing agent and ethyl chloride as the high solubility blowing agent. The molar ratio of low permeability blowing agent (e.g. HCFC-142b) to high solubility blowing agent (e.g. ethyl chloride) is from about 80:20 to about 20:80. The amount of the blowing agent mixture added to the resin is from about 0.10 to about 0.40 pound moles per 100 pounds (about 0.10 to about 0.40 kg moles per 100 kilograms) of polymer, and the more preferred amount of blowing agent mixture per polymer weight is from about 0.13 to about 0.25 pound mole of blowing agent mixture to 100 pounds (about 0.13 to about 0.25 kg mole per 100 kilograms) of polymer.

Foams produced from expanding the above described polymer with the particular blowing agent mixture have relatively low densities. Such foams may be expanded to densities of 15 pounds per cubic foot, pcf (240 kg/m$^3$) or less, preferably less than 6 pcf (96 kg/m$^3$) and most preferably less than 3 pcf (48 kg/m$^3$). Expanding to such a degree typically results in expansion rates of over 1,000 percent from the original density of the unexpanded resin. The foams of the preferred embodiment are especially well suited for producing articles of medium to large size cross sections. Such thicknesses may range from 50 mm on up.

The above described combination of polymer and blowing agent mixture is well suited to both extrusion expansion and post expansion. Extrusion as used herein refers to passing a continuous uniform polymeric melt through an extrusion die which forms the melt into a desired shape. A variation of this process known in the art, is extrusion expansion where prior to passing through the die, the melt is impregnated with a blowing agent. After exiting the die, the melt is then expanded or partially expanded to produce a foamed article.

To overcome the problems of prefoaming associated with the use of a large amount of blowing agent, an Accumulating Extrusion Expansion System (AEES) may be utilized. An AEES utilizing a moveable ram extruder is described in U.S. Pat. No. 4,323,528. The AEES provides a high instantaneous extrusion rate which enables the use of relatively large die orifice(s) which in turn provide a foam having a large cross-sectional size.

A pneumatic accumulating extrusion expansion system is shown schematically in FIG. 1. Polymer is introduced into extruder 20 through polymer feed 25 and blowing agent is injected through blowing agent feed 22. The foamable polymer melt from extruder 20 is fed into an accumulating chamber 2 against the back pressure afforded by an inert gas 4, such as nitrogen, located in chamber 2. Pressure regulated nitrogen is introduced into accumulating chamber 2 through gas inlet valve 6. At the desired pressure, outlet valve 18 is opened to allow the accumulated melt to flow toward and through die orifice 21.

Figure 2:
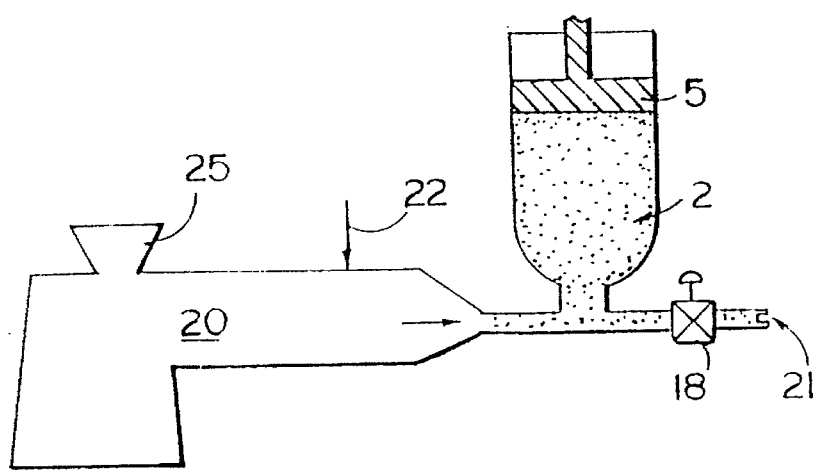
FIG. 2 illustrates a process schematic diagram for a mechanical ram Accumulating Extrusion Expansion System used in the present invention.

A mechanical ram accumulating extrusion expansion system is illustrated schematically in FIG. 2. The system is similar to a pneumatic AEES, except that the "pressure" is provided by a mechanical ram 5 located in the polymer accumulating chamber 2. The mechanical system is somewhat preferred since the ram scrapes polymer off the wall of the accumulating chamber 2. There is also no loss of blowing agent by vaporization to the inert gas phase at the polymer surface in accumulating chamber 2. Finally, the extrusion rate can be more accurately controlled.

An alternative embodiment encompassed by the present invention for foaming the above described impregnated resin is extruding and expanding coalesced strands. In this method a single orifice die is replaced by a multiple orifice die.

The preferred embodiment also encompasses manufacture of expandable resin pellets. The unexpanded or partially expanded resin pellets containing blowing agent are prepared by the extrusion process or by a batch process. In the extrusion process, the blowing agent containing polymer melt is extruded to strands, which are quenched to suppress foaming at the exit of the die orifice, and the strands are cut to pellets. In a batch process, polymer pellets are impregnated in an autoclave with blowing agent. The unexpanded or partially expanded pellets are expanded and molded to desired shapes. The advantage in this is that the particles of impregnated resin comprise a much smaller volume before expansion than after expansion thereby resulting in lower transportation costs and greater flexibility in processing options. It is crucial that the unexpanded or partially expanded particles retain the impregnated blowing agent or blowing agent mixture. Related processes may include post expansion molding where the foam particles are expanded in a molding process to produce molded foam articles.

EXAMPLE 1

Extrusion Expansion

To illustrate extrusion expansion for foaming the combination of polymer and blowing agent mixture of the present invention, a 1 inch (2.54 cm) screw type extruder having sequential zones of feeding, metering, mixing, and cooling, an extrusion die having a 0.145 inch (0.368 cm) wide rectangular orifice, and appropriate flow lines was prepared for use. The height or gap of the adjustable orifice was set at 0.022 inch (0.056 cm). KODAR PETG polyester 6763 resin was supplied to the extruder at a uniform rate of approximately 4 pounds (8.8 kg) per hour. Temperatures were maintained in the extruder as follows: 170° C. in the feeding zone, 210° C. in the melting zone and 230° C. in the metering and mixing zones. A blowing agent mixture comprising 50 mole percent of HCFC-142b and 50 mole percent ethyl chloride was prepared and injected under pressure between the metering and the mixing zones of the extruder at a uniform rate of 0.19 pound mole of blowing agent mixture per 100 pounds (0.19 kg mole per 100 kilograms) of polymer. The temperature of the cooling zone in the extruder was gradually reduced to 138° C. until the melt, after having passed through the die, expanded to a stable cellular foam body. There was no prefoaming of the impregnated resin prior to passing through the orifice. The resulting foam had a density of 1.57 pcf (25.15 kg/m$^3$) and a relatively small cell size.

EXAMPLE 2

AEES Extrusion Expansion

The following example illustrates the operation of the Accumulating Extrusion Expansion System illustrated in FIG. 1 for foaming the combination of polymer and blowing agent mixture of the present invention. The resin used was KODAR PETG 6763 resin. The resin was impregnated with a blowing agent mixture of 50 mole percent HCFC-142b and 50 mole percent of ethyl chloride. Accumulating chamber 2 and extruding unit 20 were maintained at or slightly above the melt temperature of the impregnated resin so that the resin remained at the adjusted foaming condition without being heated or cooled. Before accumulating incoming resin, accumulating chamber 2 was prepressurized with a source of nitrogen gas 4 to about 10–20 psig (0.70 to 1.41 kg/cm$^2$) higher than the pressure measured at the discharge of extruder 20 or near the inlet of accumulating chamber 2, which in this case was about 610 psig (42.89 kg/cm$^2$), by opening gas inlet valve 6 and closing outlet valve 18. The resin was accumulated in chamber 2 for 2.5 minutes. Nitrogen gas regulated to 1200 psig (84.37 kg/cm$^2$) to 1500 psig (105.46 kg/cm$^2$), preferably 1300 psig (91.4 kg/cm$^2$), was then introduced to chamber 2. Outlet valve 18 was then opened thereby forcing the charge through extrusion die 21 having a width of 0.25 inch (0.66 cm) and a die gap of 0.13 inch (0.33 cm). The extruded charge was then allowed to expand. A foam having a relatively large cross section (1.43 inch by 0.79 inch, 3.63 cm by 2.0 cm) was obtained. The foam had a cell size of 0.17 mm (determined per ASTM D3576), a density of 1.98 pcf (31.72 kg/m³), and an open cell content of 7 percent (determined per ASTM D2856-A). In contrast, the same polymeric feedstock when impregnated with the same blowing agent mixture and extruded in a conventional extrusion process utilizing a die having a 0.25 inch by 0.012 inch (0.64 cm by 0.03 cm) orifice, produced a foam having a density of 2.26 pcf (36.2 kg/m³), an open cell content of 15 percent, a cell size of 0.21 mm, and a small cross sectional area of 0.10 inch by 0.73 inch (0.25 cm by 1.85 cm).

EXAMPLE 3

AEES Extrusion Expansion

The above described Accumulating Extrusion Expansion System was utilized using a different blowing agent mixture comprising a 20:80 mole ratio of HCFC-142b and ethyl chloride. The amount of blowing agent mixture added to the polymer was the same. When the impregnated resin was passed through a conventional extrusion system at a melt temperature of 139° C. and a die gap of 0.012 inch (0.03 cm), a stable foam was produced but having a small cross sectional size. When the above described impregnated resin was accumulated in the AEES system and run through the die orifice adjusted to a die gap of 0.08 inch (0.2 cm), a foam having a 0.47 inch by 1.32 inch (1.19 cm by 3.35 cm) cross sectional size was obtained. The foam had a density of 1.90 pcf (30.43 kg/m³), a cell size of 0.27 mm, and an open cell content of 57 percent. The foam shrank slightly during ambient aging but recovered relatively quickly to its initial volume.

EXAMPLE 4

Coalesced Strand Expansion

In conjunction with a conventional extrusion process, the present inventors utilized a 1.5 inch (3.81 cm) screw type extruder and a multiple orifice die having a total of five 0.041 inch (0.104 cm) diameter holes equally spaced in an equilateral triangular pattern with 0.25 inch (0.66 cm) distance between adjacent holes.

A PETG polyester resin was impregnated with a blowing agent mixture comprising a 20:80 mole mixture of HCFC-142b and ethyl chloride. The blowing agent was injected into the extruder at a rate of approximately 0.21 pound moles per 100 pounds (0.21 kg moles per 100 kilograms) of polymer. The impregnated resin was fed to the extruder at a uniform rate of 10.3 pounds (22.7 kg) per hour. The temperatures maintained in the extruder zones were 180° C. at the feeding zone, and 230° C. at the melting, metering, and mixing zones. The extruded coalesced strands of resin exited the die at a temperature of 138° C. The extruded strands adhered to one another and expanded well to produce a good quality foam. The diameter of each foam strand was approximately 0.16 inch (0.41 cm). The foam shrank to approximately 83 percent of its original volume during aging at ambient temperature, and then recovered to 84 percent of its original volume. After aging, the density of the foam was 1.72 pcf (27.55 kg/m³) with a cell size of 0.17 mm. The foam had a substantially closed cell structure.

EXAMPLE 5

Post Expansion of Extruded Foam

The following example illustrates expansion of the extruded foam body. The coalesced strands described above were cut into one inch lengths and then heated in a hot air oven. The foam specimens were first exposed to various temperatures for a duration of 40 seconds. It was observed that the specimens expanded well at a wide temperature range (90°–160° C.) increasing by as much as 50 percent in volume (at 140° C.) as illustrated in Table I below.

TABLE I

| Temperature (°C.) | 90 | 100 | 120 | 130 | 140 | 160 |
|---|---|---|---|---|---|---|
| Volume Gain (%) | 18 | 19 | 24 | 40 | 50 | 27 |

The foam's expandability and resistance to collapse were examined by exposing the foamed specimens to a temperature of 130° C. for various times ranging from 20 seconds to 600 seconds. As illustrated in Table II, the foam expanded quickly and remained stable in the oven for periods as long as 240 seconds. The wide time-temperature window where the foam undergoes volumetric expansion in excess of 40 percent indicates that foam particles made from the polymer could be easily molded and a foam body could be easily thermoformed.

TABLE II

| Time at 130° C. (sec) | 20 | 40 | 60 | 90 | 120 | 240 | 360 | 600 |
|---|---|---|---|---|---|---|---|---|
| Volume Gain (%) | 33 | 42 | 48 | 49 | 44 | 40 | 13 | 5 |

EXAMPLE 6

Post Expansion Molding

In the following example a demonstration mold was made from a stainless steel beaker having an inside diameter of 2.55 inches (6.48 cm) and a height of 2.64 inches (6.71 cm) and fitted with a sliding piston-like top closure. Individual strands of extruded impregnated resin were cut to particles of 0.25 inch (0.64 cm) in length. The particles were aged for 17 days. The mold was filled with these particles and gently compressed by moving the lid inwards, a distance about 20 percent of the beaker height. The filled mold was then heated in an oven at 137° C. for five minutes and the contents further compressed by moving the lid to about 45 percent of the beaker height for about two minutes in order for the particles to weld. The above described operation provided excellent quality molding of 2.52 inch (6.4 cm) diameter and 1.53 inch (3.89 cm) thickness, having a density of about 2 pcf (32 kg/m³). The moldings were tough, resilient, and dimensionally stable. These moldings were than compared with a low density polyethylene foam having a density of 2.14 pcf (34.28 kg/m³), as illustrated in Table III.

TABLE III

| Property | | PETG Molding | Polyethylene Foam |
|---|---|---|---|
| Density, pcf (kg/m³) | | 2.00 (32) | 2.14 (34.28) |
| Cell Size, mm: | | 0.17 | 1.8 |
| Compressive | 5% | 4.6 (0.32) | 6.1 (0.43) |
| Strength in psi | 10% | 7.9 (0.56) | 7.1 (0.50) |
| (kg/cm²) at | 25% | 11.9 (0.84) | 9.0 (0.63) |
| Deflection of: | 50% | 21.3 (1.50) | 17.6 (1.24) |

TABLE III-continued

| Property | | PETG Molding | Polyethylene Foam |
|---|---|---|---|
| | 75% | 52.8 (3.71) | 48.2 (3.39) |
| Dynamic Cushioning | 0.20 (.01) | 85 | 75 |
| (Peak G. Avg. of | 0.36 (.03) | 67 | 63 |
| 2–5 Drops) at | 0.40 (.03) | 72 | 64 |
| Static Stress in | 0.66 (.05) | 65 | 64 |
| psi (kg/cm²) of: | 0.91 (.06) | 82 | 73 |
| | 1.42 (.10) | 109 | 102 |
| | 2.04 (.14) | 216 | 153 |
| Recovery of | 0.20 (.01) | 101 | 99 |
| Thickness in one | 0.36 (.03) | 100 | 99 |
| day After Dynamic | 0.40 (.03) | 99 | 98 |
| Cushioning Test | 0.66 (.05) | 98 | 98 |
| (% of the Initial) | 0.91 (.06) | 98 | 97 |
| Tested at Static | 1.42 (.10) | 96 | 96 |
| Stress₂ in psi | 2.04 (.14) | 93 | 94 |
| (kg/cm²) of: | | | |

EXAMPLE 7

PETG Foam Moldings

This example shows that PETG foam moldings have a low thermal conductivity thereby making them suitable for insulation application. In practice, a foam block molding having about 1.64 pcf (26.27 kg/m$^3$) density and approximately 4 inch×4 inch by 1.125 inch (10.2 cm by 10.2 cm by 2.86 cm) dimensions was prepared by a procedure similar to that employed in Example 6. A different mold having a square cross section was used. The foam was 35 days old when the molding was made. Thermal conductivity of the fresh molding was determined to be 0.208 B.t.u./hr ft$^2$ (°F./in) (0.258 g. cal/hr cm$^2$ (°C./cm)). Analysis of the foam molding indicated that it contained a small amount (1.3 pph) of HCFC-142b, which contributed slightly to the observed low thermal conductivity. However, the unusually low thermal conductivity of the PETG foam molding cannot be totally attributed to the presence of a small amount of HCFC-142b as further tests showed.

The thermal conductivity of the foam block was periodically monitored while the foam specimen was aged at 140° F. (60° C.) for over 7 months. It was envisioned that the thermal conductivity would drift upward as HCFC-142b diffused out of the foam body. As shown in Table IV, the thermal conductivity of the foam reached an essentially constant value of about 0.224 B.t.u./hr ft$^2$ (°F./in) (0.278 g. cal/hr cm$^2$ (°C./cm)) after about a month in the oven. The low thermal conductivity exhibited by the foam containing essentially no low-thermal conductivity gas is significant in this era of increasing legislation against the use of halogenated hydrocarbon blowing agents. The foam's fine cell size and inherent (infra-red blocking) properties of the polyester resin are inferred to contribute to its low thermal conductivity.

TABLE IV

| Aging Time in 140° F. (60° C.) Oven (days) | Thermal Conductivity in B.t.u./ hr ft² (°F./in), (g.cal/hr cm² (°C./cm)) |
|---|---|
| 0 | 0.208 (.258) |
| 7 | 0.216 (.268) |

TABLE IV-continued

| Aging Time in 140° F. (60° C.) Oven (days) | Thermal Conductivity in B.t.u./ hr ft² (°F./in), (g.cal/hr cm² (°C./cm)) |
|---|---|
| 17 | 0.220 (.273) |
| 26 | 0.221 (.274) |
| 35 | 0.223 (.277) |
| 53 | 0.226 (.280) |
| 89 | 0.228 (.283) |
| 104 | 0.229 (.284) |
| 148 | 0.230 (.285) |
| 207 | 0.211 (.262) |

EXAMPLE 8

Post Expansion

Polyester resin impregnated with the blowing agent HCFC-142b was formed into particles 1.7 mm in diameter and 4.8 mm in length and aged in a pressure vessel at 80° C. for nine days. The particles were subsequently determined to initially contain approximately 6.7 parts per hundred of the blowing agent. Retention of the blowing agent was subsequently monitored as illustrated in Table V. As shown in Table V, the particles retain the blowing agent quite well. After six months, the particles aged at ambient temperature and at −10° C. retained 89 percent and 97 percent blowing agent respectively.

TABLE V

| Aging Time | Blowing Agent Retention (% of the initial) | |
|---|---|---|
| (days) | @ 23° C. | @ −10° C. |
| 0 | 100 | 100 |
| 7 | 98 | 99 |
| 15 | 97 | 99 |
| 24 | 94 | 99 |
| 52 | 92 | 98 |
| 183 | 89 | 97 |

EXAMPLE 9

Use of Non-Amorphous Polymers

As previously noted, the preferred embodiment utilizes an amorphous polymer since as demonstrated by the following example, non-amorphous polymers do not produce suitable low density foams. The foam extrusion test of Example 1 was repeated with KODAPAK PET 9663 from Eastman Chemical, a poly(ethyleneglycol terephthalic acid) resin having a number average molecular weight of 26,000. KODAPAK 9663 has a crystallization half-time of less than 10 seconds, and thus is non-amorphous as that term is used herein. This foam extrusion test utilized the same apparatus and antioxidant, as in Example 1. However, instead of a blowing agent mixture of 50 mole percent HCFC-142b and 50 mole percent ethyl chloride as used in Example 1, a mixture of 20 mole percent HCFC-142b and 80 mole percent of methyl chloride was employed. This mixture was added to the polymer melt at a rate of 0.19 pound mole of blowing agent mixture per 100 pounds of polymer melt. The extruder zones had to be maintained at higher temperatures than in Example 1 in order to accommodate the relatively high melting temperature of the KODAPAK 9663 resin. The temperatures maintained at the extruder feeding, melting, metering, and mixing zones were 167° C., 246° C., 270° C., and 265° C., respectively. As in Example 1, the temperature of the cooling zone was gradually reduced in an attempt to determine the optimum foaming condition. Foam expansion did not occur at any temperature from the time the melt exited the extruder until it cooled to a temperature of 196° C., at which temperature the melt froze.

CONCLUSION

Of course, it is understood that the foregoing merely notes preferred embodiments of the invention and that various changes and alterations can be made without departing from the spirit and broader aspects thereof as set forth in the appended claims, which are to be interpreted in accordance with the principals of patent law, including the Doctrine of Equivalents.

The embodiments of the invention in which an exclusive property or privilege is claimed are defined as follows:

1. A method of expanding an amorphous polyethylene terephthalate polymer to produce a low density foam, said method comprising:

adding a blowing agent mixture comprising a low permeability blowing agent and a high solubility blowing agent to said polymer thereby forming a resin; and expanding said resin to produce said foam.

2. A method of expanding an amorphous polyethylene terephthalate polymer by use of a blowing agent mixture comprising a low permeability blowing agent and a high solubility blowing agent, wherein said method comprises:

adding an effective amount of said blowing agent to said polymer;

accumulating the resulting homogenous mixture of polymer and blowing agent in an accumulating chamber;

pressurizing said accumulating chamber and ejecting the polymer-blowing agent melt under such pressure through a die orifice to extrude and expand said polymer-blowing agent mixture.

3. A method of expanding an amorphous polymer in accordance with claim 2 wherein said method further comprises:

prepressurizing said accumulating chamber, before said accumulating step, to a pressure of about 10 to about 20 psig greater than the pressure of said homogenous mixture to be accumulated in said chamber.

4. A method of expanding an amorphous polymer in accordance with claim 2 in which said accumulating chamber is pressurized to about 1200 to about 1500 psig.

5. A method of forming and expanding coalesced strands comprising an amorphous polyethylene terephthalate polymer and a blowing agent mixture, said method comprising:

adding an effective amount of said blowing agent to said polymer;

accumulating the resulting homogenous mixture of polymer and blowing agent in an accumulating chamber;

pressurizing said accumulating chamber and ejecting the polymer-blowing agent melt under such pressure through a multiple orifice die to extrude and expand said polymer-blowing agent mixture;

extruding said charge through said multiple orifice die to form said coalesced strands; and expanding said coalesced strands.

6. A method in accordance with claim 5 in which said melt is extruded through said multiple orifice die having orifice diameters of about 0.041 inch.

7. A method of expanding a resin particle comprising an amorphous polyethylene terephthalate polymer and a blowing agent mixture, said blowing agent mixture comprising a low permeability blowing agent and a high solubility blowing agent, said method comprising: heating said resin particle at a temperature of from about 90° C. to about 160° C. for a sufficient period of time to allow for expansion to occur.

8. A method of forming a low density foam from an amorphous polymer comprising:

adding a blowing agent to an amorphous polyethylene terephthalate polymer; and expanding said foam to a density of 15 pcf or less.

9. A method of forming a low density foam in accordance with claim 8 wherein said blowing agent is a mixture of a low permeability blowing agent and a high solubility blowing agent.

10. A method of forming a low density polyester foam, said method comprising:

providing an amorphous copolyester resin of polyethylene terephthalate and a reaction product of a cyclic alkyl diol and terephthalic acid;

adding a blowing agent to said resin to form a melt; and expanding said melt to produce said foam.

11. The method of claim 10, wherein said cyclic alkyl diol is cyclohexanedimethanol.

12. The method of claim 11, wherein said reaction product is formed from said cyclohexanedimethanol, said terephthalic acid and ethylene glycol.

13. The method of claim 12, wherein said cyclohexanedimethanol is in an amount of from about 80 percent to about 20 percent of the total of said cyclohexanedimethanol and said ethylene glycol, and said ethylene glycol is in an amount of from about 20 percent to about 80 percent of the total of said cyclohexanedimethanol and said ethylene glycol.

14. The method of claim 11, wherein said reaction product is formed from said cyclohexanedimethanol, said terephthalic acid and isophthalic acid.

15. The method of claim 14, wherein said terephthalic acid is in an amount of from about 50 percent to about 85 percent of the total of said terephthalic acid, said isophthalic acid, and said cyclohexanedimethanol; and said isophthalic acid, said cyclohexanedimethanol, or mixtures thereof, is in an amount of from about 15 percent to about 50 percent of the total of said terephthalic acid, said isophthalic acid, and said cyclohexanedimethanol.

16. A low density foam having a density less than about 15 pcf, said foam comprising an amorphous copolyester resin and a blowing agent, said copolyester resin formed from polyethylene terephthalate and a reaction product of a cyclic alkyl diol and terephthalic acid.

17. The foam of claim 16, wherein said cyclic alkyl diol is cyclohexanedimethanol.

18. The foam of claim 17, wherein said reaction product is formed from said cyclohexanedimethanol, said terephthalic acid and ethylene glycol.

19. The foam of claim 18, wherein said cyclohexanedimethanol is in an amount of from about 80 percent to about 20 percent of the total of said cyclohexanedimethanol and said ethylene glycol, and said ethylene glycol is in an amount of from about 20 percent to about 80 percent of the total of said cyclohexanedimethanol and said ethylene glycol.

20. The foam of claim 17, wherein said reaction product is formed from said cyclohexanedimethanol, said terephthalic acid and isophthalic acid.

21. The foam of claim 20, wherein said terephthalic acid is in an amount of from about 50 to about 85 percent of the total of said terephthalic acid, said isophthalic acid, and said cyclohexanedimethanol; and said isophthalic acid, said cyclohexanedimethanol, or mixtures thereof, is in an amount of from about 15 percent to about 50 percent of the total of said terephthalic acid, said isophthalic acid, and said cyclohexanedimethanol.

* * * * *